US008041603B2

(12) United States Patent
Suk (10) Patent No.: US 8,041,603 B2
(45) Date of Patent: Oct. 18, 2011

(54) SYSTEM AND METHOD FOR REIMBURSING MERCHANTS FOR REDEEMED ELECTRONIC COUPONS

(76) Inventor: Alex Suk, Northfield, IL (US)

( * ) Notice: Subject to any disclaimer, the term of this patent is extended or adjusted under 35 U.S.C. 154(b) by 461 days.

(21) Appl. No.: 11/936,521

(22) Filed: Nov. 7, 2007

(65) Prior Publication Data

US 2008/0154676 A1    Jun. 26, 2008

Related U.S. Application Data (63) Continuation-in-part of application No. 11/893,479, filed on Aug. 16, 2007, now Pat. No. 7,578,435, which is a continuation of application No. 10/772,631, filed on Feb. 5, 2004, now abandoned.

(60) Provisional application No. 60/864,719, filed on Nov. 7, 2006.

(51) Int. Cl.
*G06F 17/00*    (2006.01)
(52) U.S. Cl. .................................... 705/14.38
(58) Field of Classification Search ................ 705/14.38
See application file for complete search history.

(56) References Cited

U.S. PATENT DOCUMENTS

| | | |
|---|---|---|
| RE34,915 E | 4/1995 | Nichtberger |
| 5,513,102 A | 4/1996 | Auriemma |
| 5,644,723 A | 7/1997 | Deaton |
| 5,857,175 A | 1/1999 | Day |
| 5,945,653 A | 8/1999 | Walker |
| 6,041,309 A | 3/2000 | Laor |
| 6,076,069 A | 6/2000 | Laor |
| 6,260,758 B1 | 7/2001 | Blumberg |
| 6,321,210 B1 | 11/2001 | O'Brien |
| 6,332,128 B1 | 12/2001 | Nicholson |
| 6,334,108 B1 | 12/2001 | Deaton et al. |
| 6,732,081 B2 | 5/2004 | Nicholson |
| 6,778,967 B1 | 8/2004 | Nicholson |
| 6,937,995 B1* | 8/2005 | Kepecs ...................... 705/14.27 |
| 7,188,085 B2 | 3/2007 | Pelletier |
| 7,398,225 B2 | 7/2008 | Voltmer |
| 7,424,441 B2 | 9/2008 | George |
| 2002/0013728 A1 | 1/2002 | Wilkman |
| 2002/0032609 A1 | 3/2002 | Wilkman |

(Continued)

FOREIGN PATENT DOCUMENTS

KR    100390531    6/2002

OTHER PUBLICATIONS

International Search Report and Written Opinion for PCT/US2007/083945.

(Continued)

*Primary Examiner* — Thomas Dixon
(74) *Attorney, Agent, or Firm* — Brad Bertoglio (57) ABSTRACT

A system and method are provided for reimbursing merchants for coupons used by the customers of those merchants is disclosed. Pursuant to the Present Invention, a Coupon Data File is prepared, identifying the products potentially subject to coupons and/or incentives, and the nature of the associated discount. A Transaction Log Data File is also prepared, describing one or more purchase transactions undertaken by consumers. Finally, a Transaction Log Processor analyzes the transaction log data, compares the information in the Transaction Log Data File with information in the Coupon Data File and tabulates coupons redeemed by consumers during the transactions associated with the information in the Transaction Log Data.

6 Claims, 4 Drawing Sheets

U.S. PATENT DOCUMENTS

| | | |
|---|---|---|
| 2002/0046089 A1 | 4/2002 | Zorn |
| 2002/0049631 A1 | 4/2002 | Williams |
| 2002/0107738 A1 | 8/2002 | Beach |
| 2002/0178060 A1 | 11/2002 | Sheehan |
| 2002/0188509 A1 | 12/2002 | Ariff |
| 2002/0194069 A1 | 12/2002 | Thakur |
| 2003/0028518 A1 | 2/2003 | Mankoff |
| 2003/0029540 A1 | 2/2003 | Stromberg |
| 2003/0130891 A1 | 7/2003 | Jacobs |
| 2003/0158796 A1 | 8/2003 | Balent |
| 2003/0167203 A1 | 9/2003 | Thorne |
| 2003/0195806 A1 | 10/2003 | Wilman |
| 2003/0200146 A1 | 10/2003 | Levin |
| 2003/0229540 A1* | 12/2003 | Algiene ................ 705/14 |
| 2004/0024638 A1 | 2/2004 | Restis |
| 2004/0024703 A1 | 2/2004 | Roskind |
| 2004/0049427 A1 | 3/2004 | Tami et al. |
| 2004/0167821 A1 | 8/2004 | Baumgartner |
| 2005/0160003 A1 | 7/2005 | Berardi |
| 2005/0194454 A1 | 9/2005 | Ferber |
| 2005/0256772 A1 | 11/2005 | Tang |
| 2006/0020512 A1* | 1/2006 | Lucas et al. ................ 705/14 |

OTHER PUBLICATIONS

International Search Report and Written Opinion for PCT/US2007/083968.

* cited by examiner

SYSTEM AND METHOD FOR REIMBURSING MERCHANTS FOR REDEEMED ELECTRONIC COUPONS

CROSS REFERENCES TO RELATED APPLICATIONS

The following and commonly assigned U.S. patent applications relate to and further describe other aspects of the Present Invention, and are all herein incorporated by reference in their entireties:

U.S. Non-Provisional patent application Ser. No. 10/772,631, entitled "Couponing System," filed on 5 Feb. 1994;

PCT Patent Application No. PCT/US2004/040539, entitled "Couponing System," filed on 26 Dec. 1994;

U.S. Provisional Patent Application No. 60/864,727, entitled "Point-Of-Sale System Implementing Criteria-Based Transaction Totals," filed on 7 Nov. 2006;

U.S. Non-Provisional patent application Ser. No. 11/893,479, entitled "Couponing System," filed on 16 Aug. 2007; and U.S. Non-Provisional patent application Ser. No. 11/936,643, entitled "Point-Of-Sale System Implementing Criteria-Based Transaction Totals," filed on 7 Nov. 2007.

Further, the Present Invention claims priority as a Continuation-in-Part to previously filed U.S. Non-Provisional patent application Ser. No. 10/772,631, entitled "Couponing System," filed on 5 Feb. 2004, and Ser. No. 11/893,479, entitled "Couponing System," filed on 16 Aug. 2007. Finally, the Present Invention claims priority to previously-filed U.S. Provisional Patent Application No. 60/864,719, entitled "System And Method For The Processing Of Electronic Coupons," filed on 7 Nov. 2006.

FIELD OF THE PRESENT INVENTION

The Present Invention relates in general to the marketing of consumer products, and, in particular, to the electronic processing of coupons or other criteria-based discounts and/or promotions in consumer purchases.

BACKGROUND OF THE PRESENT INVENTION

Most retailers conduct consumer transactions pursuant to electronic point-of-sale ("POS") systems. These systems typically have a cashier terminal, which includes a scanner and a display to show the selling price of a product. The scanner generally used with these POS systems will typically scan a bar code, or other similar indicator identifying the product, through the use of a laser reading device. Typically, the display will illustrate both the individual product cost and a running total cost. Once each product has been processed, or read, in this manner, a consumer can often pay for the products through a payment interface.

Payment interfaces typically allow a consumer to "swipe" a payment card, e.g., a credit or debit card, into an appropriate mechanism on the payment interface. This swiping process more particularly consists of sliding a payment card through a receiving slot disposed on the payment interface such that the payment interface can obtain relevant information from the readable strip of magnetic tape located on the back of the payment card.

Oftentimes, payment interfaces will also have a Personal Identification Number ("PIN") interface, usually in the form of a typepad, that will allow the consumer to input a PIN, verifying that the consumer is the proper holder of the payment card. The payment interface then receives the total transaction amount from the cashier terminal and processes the payment for that amount, directly through the network of the payment card issuer. The payment interface then sends approval back to the cashier terminal, confirming a successful payment transaction. Alternatively, the processing of the payment may occur at the cashier terminal.

Such POS equipment is often configured to allow for the use of conventional paper coupons. The use of conventional paper coupons to market and promote specific products is well known in the consumer sales industry. Conventional paper coupons are commonly distributed by various means, such as newspaper inserts, postal mailings, etc., and are usually structured to provide a consumer with an incentive to buy a particular product.

Coupons provide a discount on the purchase price of a specific product that a manufacturer wants to promote. The discount may be offered, for example, directly by listing the monetary value of the discount on the face of the coupon or indirectly by providing, for example, a percentage—or other—reduction or a premium if the consumer purchases a product (or, in some cases, a collection of products). The premium may be an offer for a second—or subsequent—product at no cost, or the offer of another related (or unrelated) product.

Coupons are sometimes used by manufacturers to promote sales of products that may be overstocked or outdated. Additionally, coupons may be used to promote new products and build brand recognition or share. Finally, coupons allow the manufacturer of a product to offer a particular product at a reduced price without actually changing the list price for that product.

Generally, a merchant provides a coupon incentive to a consumer immediately, such as upon the completion of a sale/purchase transaction of a particular product. In most instances, the coupon incentive has been authorized by the manufacturer of the particular product. Alternatively, the coupon incentive may be authorized by a third party specializing in the sponsorship of coupons. Once a merchant accepts a coupon from a consumer relating to a product, the merchant may then redeem the coupon for cash or other consideration from the manufacturer. Because a merchant will commonly redeem a large number of coupons from a wide variety of manufacturers, coupon clearinghouses are usually employed to sort, separate, count and authenticate the coupons, as well as to submit each coupon to its authorizer/sponsor for reimbursement, and distribute at least a portion of the reimbursement back to the merchant. In many cases, the coupon clearinghouse will usually collect a commission, and reduce the reimbursement by this commission, based upon the value of the redeemed coupons.

Unfortunately, currently-known paper coupon redemption systems comprise a very labor intensive process for both the manufacturer and the merchant. Additionally, the merchant must not only accept and grant credit for the coupons, but must also accept responsibility for physically transferring the coupons to a coupon clearinghouse.

Additionally, while conventional paper coupons may be effective in helping manufacturers dispose of merchandise, promote sales of overstocked or outdated products, promote new products and/or build brand recognition, the handling of such conventional paper coupons is burdensome and commonly subject to fraud, since conventional paper coupons may be easily duplicated, and the current system does not audit satisfactorily whether the conventional paper coupons were actually used by consumers in connection with the sale/purchase transaction for which the conventional paper coupons were issued.

Further, currently-known paper coupon redemption systems used in most merchant/retailer transactions validate conventional paper coupons by verifying that the Universal Product Code ("UPC") associated with a product belongs to a family of products (defined by the manufacturer). In this situation, the merchant is ultimately responsible for maintaining accurate family codes on their POS system. As a result of this burden, some merchants have been typically known to bypass the family code portion of the validation process and only validate that the product is from an associated manufacturer.

Finally, in the circumstance where the brand of a particular product changes ownership from one manufacturer to another, the associated UPC is required to be changed. This leads to a situation which could be confusing to a consumer: Two different coupons are issued for one product, one from each manufacturer. Alternatively, to avoid this consumer confusion (as well as any accounting reconciliation), the new manufacturer is required to wait until the distribution channels have cleared before offering a coupon.

Accordingly, a need exists for a less labor-intensive, more flexible, and more secure method of generating and processing coupons.

SUMMARY OF THE PRESENT INVENTION

A system and method are provided for reimbursing merchants for coupons used by the customers of those merchants is disclosed. Pursuant to the disclosure contained herein, a Coupon Data File is prepared, identifying the products potentially subject to coupons and/or incentives, and the nature of the associated discount. The Coupon Data File may further contain redemption criteria indicating the criteria required for the authorized redemption of any associated coupons. Any analysis of whether the criteria is met, resulting in the application of a coupon to the purchase of a product, is generally determined at the POS of the merchant (a Transaction Log Processor performs this step again, confirming that the criteria is met).

A Transaction Log Data File is also prepared. The Transaction Log Data File describes one or more purchase transactions undertaken by consumers. The Transaction Log Data File may further contain purchase records, describing the specific products purchased; redemption records, corresponding to coupons or incentives redeemed by the consumers in connection with the purchase; as well as any other relevant and related information.

Previously introduced, the Transaction Log Processor analyzes the transaction log data, compares the information in the Transaction Log Data File with information in the Coupon Data File and tabulates coupons redeemed by consumers during the transactions associated with the information in the Transaction Log Data. This tabulated coupon redemption information can then be used by an accounting server to generate invoices directed to the manufacturer or sponsor of the coupon.

The Transaction Log Processor may further analyze the Transaction Log Data File relative to the redemption criteria records to determine whether each redemption criteria corresponds to an authorized coupon redemption. As an example, the redemption criteria may require that any authorized transactions be undertaken using a consumer-initiated action electronically identifiable by the POS (e.g., using a predetermined method of payment, reacting positively to a prompted request, etc.). In other examples, the redemption criteria may provide a discount on one product when a related product is purchased, or a discount on the subsequent purchase of a product when a specified number of that product is purchased. In all such instances, the Transaction Log Data File would preferably include information relating to the satisfaction of the redemption criteria.

DETAILED DESCRIPTION OF THE PRESENT INVENTION

While the Present Invention is susceptible to embodiment in many different forms, there are shown in the Figures, and as will be described in detail herein, several specific embodiments, with the understanding that this disclosure is to be considered as an exemplification of the principles of the Present Invention and is not intended to limit the Present Invention to the illustrated embodiments.

Figure 1:
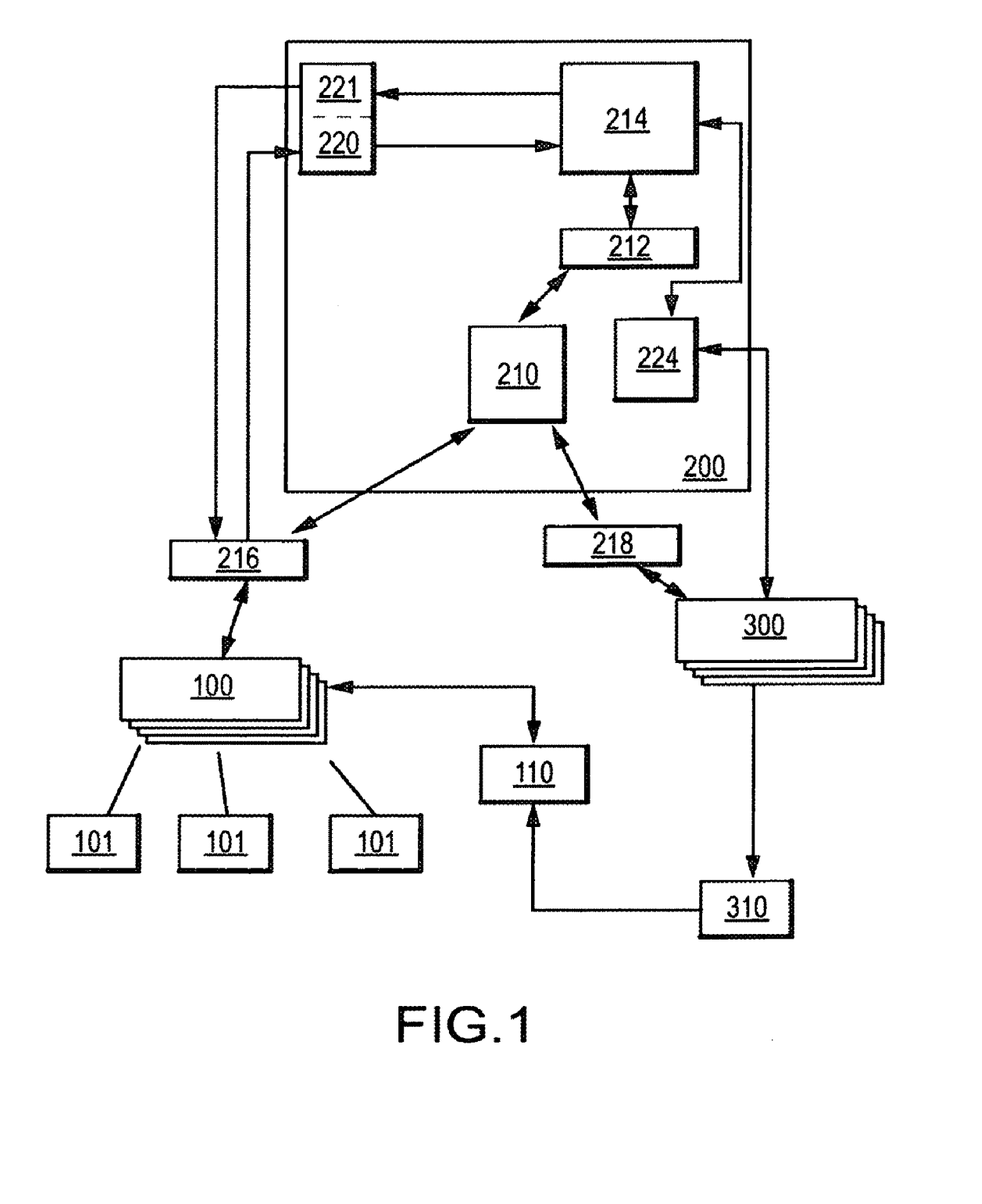
FIG. 1 is a block diagram of a coupon processing system, in accordance with one aspect of the Present Invention.

FIG. 1 illustrates a block diagram representing a system for processing coupons or discounts, in accordance with one aspect of the Present Invention. For purposes of the Present Invention, the term "coupon" shall mean any discount or other reduction in the sales price of a product, provided by a merchant, whether retail or wholesale, as well as any incentive, provided by a merchant, whether retail or wholesale, relating to that product.

Referring to FIG. 1, as illustrated, Coupon Processing Center 200 operates in connection with at least one merchant 100 (a plurality is illustrated in FIG. 1). This communication between Coupon Processing Center 200 and each merchant 100 may be effected through firewall 216 (which may be located inside Coupon Processing Center 200 or between Coupon Processing Center 200 and merchant 100). Each merchant 100 on FIG. 1 preferably represents the office location of a merchant, and includes both retail and wholesale merchants. For purposes of the Present Invention, each merchant 100 illustrated and discussed herein desires to provide or sponsor a coupon for a particular product to a consumer, the coupon being provided to each merchant 100 via—ultimately—manufacturer 300 (a plurality is illustrated in FIG. 1). As part of its own organizational structure, each merchant 100 communicates with plurality of sales locations, or stores 101. Another embodiment of the Present Invention should be understood in which merchant 100 and sales location 101 comprises the same location, such as in the situation in which merchant 100 maintains only one sales location 101.

Coupon Processing Center 200 is adapted to communicate with each manufacturer 300. It should be understood, however, for purposes of the Present Invention, that manufacturer 300 may also include product suppliers, distributors or other entities that, similar to merchant 100 above, desires to provide or sponsor a coupon for a particular product to a consumer.

In some embodiments, Coupon Processing Center 200 will preferably coordinate with each manufacturer 300 in an effort to determine the products that will be "couponed," i.e., subject to a coupon discount for a given period of time, as well as the nature of any discount and any predetermined condition (s) that must be satisfied to realize any discount. Based on this coordination, an Coupon Data File is then prepared for each merchant 100.

The Coupon Data File preferably contains information relating to each "coupon event," such as the coupon start and end date; a paperless instant coupon ("PIC") code (providing a unique reference code for every "coupon event"); a coupon reward type indicator (e.g., the amount/percent of the discount, whether a free product can be received, etc.); a coupon reward value; any purchase quantity required to receive the discount; whether there is a monetary limit; whether there is a limit on the number of times a coupon can be used within a single transaction; any payment type validation criteria; an associated list of product identifying indicia (i.e., the UPC of the product); a list of included/excluded merchant locations; and any additional criteria that describe any various other requirements. While the Coupon Data File in the illustrated embodiment is prepared on a monthly basis, it should be understood that the period for preparation of Coupon Data Files can vary.

In some circumstances, it may be desirable to coordinate the determination of products for which coupons will be available to each merchant 100 among each manufacturer 300 in an effort to maximize potential profit. For example, it may be desirable to ensure that only one brand of bacon is "couponed" during the month of September. This can help ensure that the bacon manufacturer who elects to offer a discount during September receives optimal marketing benefits for its "coupon event," rather than competing against other discounted bacon products.

To facilitate the coordination of such promotions, as well as communication between each manufacturer 300 and each merchant 100, Coupon Processing Center 200 includes server 210. Server 210 preferably provides a Collaboration Site accessible by each manufacturer 300 (the communication aspect of which may be realized through firewall 218). Among other features, the Collaboration Site can provide an interface for access to information residing on database 214 of Coupon Processing Center 200, which may be accessed via firewall 212.

Figure 2:
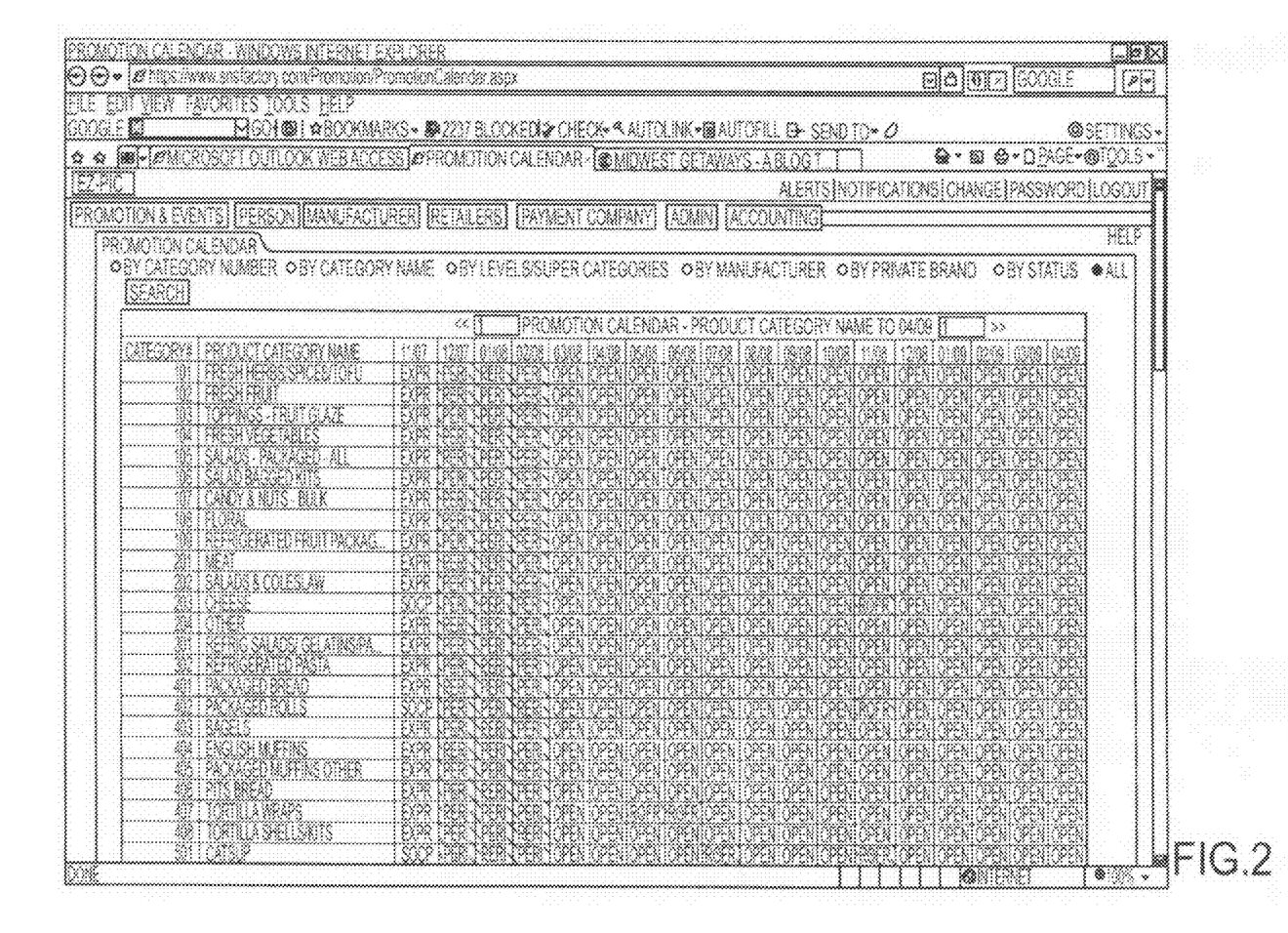
FIG. 2 illustrates a screen shot of a promotion calendar, used in accordance with the block diagram of FIG. 1.

FIG. 2 illustrates one aspect of the information that may be collected by the Collaboration Site. More particularly, as illustrated in FIG. 2, the Collaboration Site preferably includes Promotion Calendar 400. Promotion Calendar 400 preferably includes a row for each product category and a column for each time interval. In the embodiment illustrated by FIG. 2, the time intervals are designated on a monthly basis. Promotion Calendar 400 illustrates which product categories are available to be, or have already been, "couponed."

Each manufacturer 300 can access Promotion Calendar 400 to determine which product or product categories are eligible for "couponing," and plan their campaigns accordingly. Further, merchant 100, or sales locations 101 may have many different categories of products that can be discounted. Thus, server 210, and, in particular Promotion Calendar 400, can provide a centralized location which allows merchant 100 to accept and/or reject "coupon events."

Once the coupons to be offered during a particular month are determined, Coupon Processing Center 200 generates a corresponding Coupon Data File, which is transferred to outbox 221. A message can then be transmitted to one or more intended merchants 100, alerting each merchant 100 that the Coupon Data File is ready for retrieval. In the embodiment illustrated by FIG. 1, an electronic message is sent to each merchant 100. At some point before the coupon event is set to begin, each merchant 100 can access outbox 221 and download the Coupon Data File. Outbox 221 is configured to track whether and when the Coupon Data File is downloaded by each intended merchant 100. Further, each intended merchant 100 will preferably communicate back to Coupon Processing Center 200 the status of the Coupon Data File.

Follow-up communications may be sent periodically if the Coupon Data File is not downloaded as the coupon event start date approaches. Further, a date threshold can be set, such that any Coupon Data Files that have not been downloaded within a predetermined time period prior to the start of the coupon event corresponding to the Coupon Data File will trigger a message to a Customer Service Agent for Coupon Processing Center 200. At this point, the Customer Service Agent can then follow up in person with each merchant 100 to ensure that the Coupon Data File is downloaded and installed into the POS system of each merchant 100 in advance of the coupon event start date.

By availing the Coupon Data File to each merchant 100 well in advance of the start of the corresponding "coupon event," each merchant 100 obtains advance notice of the products that will be "couponed," as well as relevant information relating to the "coupon event." This information can be beneficially employed by each merchant 100 to optimize its inventory. For example, each merchant 100 can forecast projected increases in demand for products subject to upcoming "coupon events," and increase inventories of those products in advance of the "coupon event."

Once retrieved by each merchant 100, the Coupon Data File is preferably distributed by each merchant 100 to sales locations 101. At that point, the Coupon Data File is uploaded into the POS system of each sales location 101.

Shelf tags or the like are preferably printed by each merchant 100 or sales locations 101, and preferably displayed near the "couponed" products. Alternatively, the printing may be done by another entity, such as under auspices of Coupon Processing Center 200, and sent to each merchant 100. By advertising the promotion using shelf tags rather than printed coupons distributed via newspaper or mail, each merchant 100, each sales locations 101 and each manufacturer 200 and/or promotion sponsor are able to inform every consumer who considers purchasing that product or any similar, nearby product, of the promotion, rather than only consumers who received (and remembered to bring with them) a conventional paper coupon.

Further, the procedure described in the paragraph above regarding shelf tags has the added benefit of reducing the printing, distribution and handling costs. Moreover, the increased efficiency and reduced costs involved in implementing a promotion in the described manner permits each manufacturer 300 to increase the level of discount offered, while maintaining the bottom line cost for each redemption—thus increasing the benefit of the promotion to the consumer.

Figure 3A:
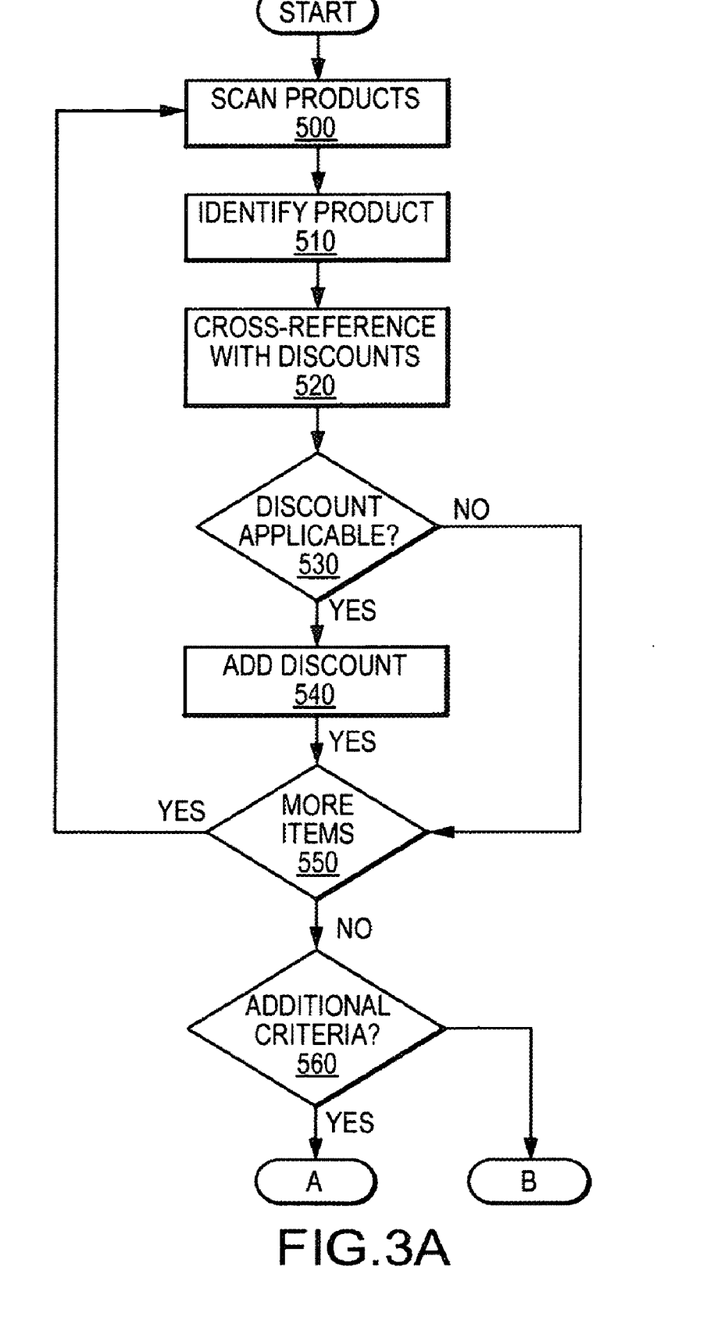
FIGS. 3A and 3B illustrate a flow chart in accordance with one aspect of the Present Invention.
Figure 3B:
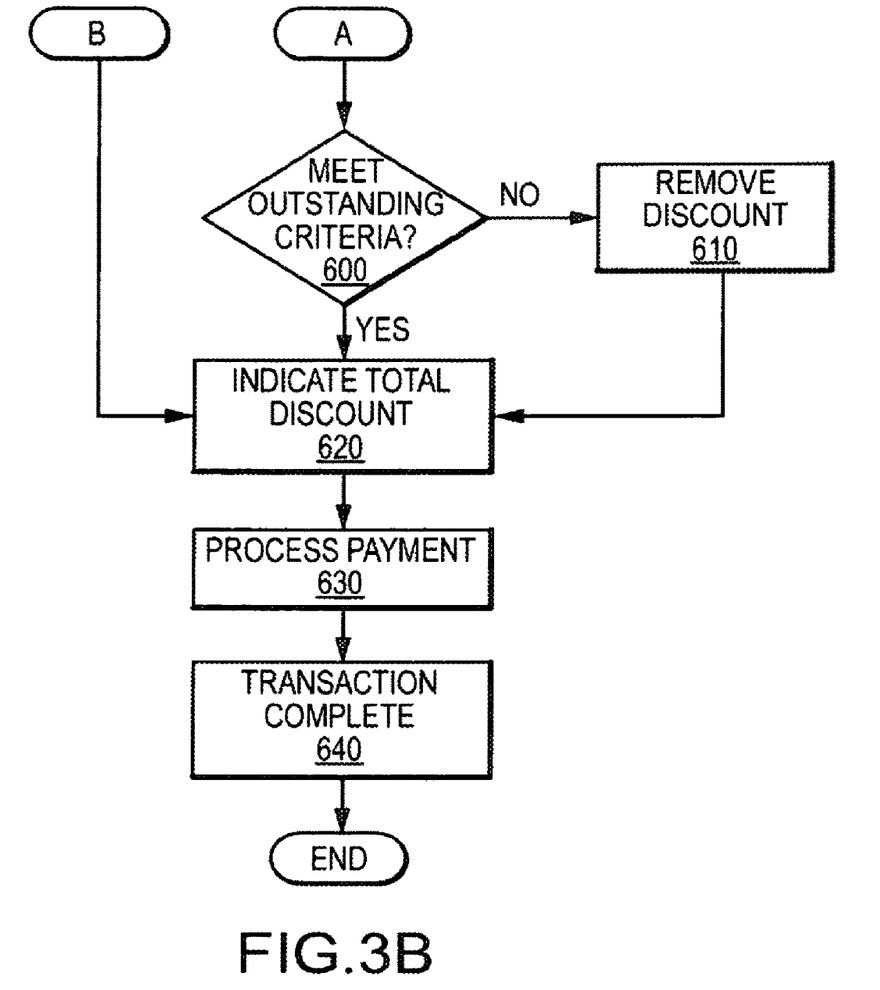

FIGS. 3A and 3B illustrate a flowchart detailing the process by which a consumer receives a discount, as provided by a coupon, in accordance with the teachings and tenets of the Present Invention. The following description will be understood with reference to the Steps, or Blocks, of FIGS. 3A and 3B.

As a consumer purchases (or, more particularly, intends to purchase) a product, each product is identified or recognized by the POS system of either merchant 100 or sales locations 101 (Block 500). For example, many POS systems use barcode readers to determine the UPC, Global Trade Identification Number, European Article Number, Stock Keeping Unit or other identifying indicia for each item purchased by a customer. Once a product has been recognized, the identifying indicia of the product is referenced by the POS system through a Pricing Processor to determine, for example, the name of the product and its price, as well as any other relevant information (Block 510). The identifying indicia is then cross-referenced with the Coupon Data File, previously received by merchant 100, by a Discount Processor (Block 520), to determine whether the product is eligible for a discount, any applicable criteria of the discount and the amount of the discount. The Discount Processor may optionally be implemented in conjunction with the Pricing Processor. If all criteria are met for the application of a discount after scanning a product (Block 530), the coupon discount is awarded and applied to the product (Block 540). Subsequently, if a product is removed (i.e., returned, voided or canceled) from the transaction, and/or the criteria for the application of a coupon discount is no longer satisfied, the discount is removed from the transaction.

Once a consumer's order has been completely scanned (Block 550), including the satisfaction of any outstanding requirements, the POS system provides an indication of the eligibility to the consumer for additional pending (although not already applied) discounts, and the amount of the potential discount of the coupons that could be applied (Block 560). These additional pending discounts are as described above, and would include discounts depending on the number of products purchased, the payment method used, etc. Using a predetermined list of payment methods, or responses to prompts, or any other qualifying criteria, if the actions of the consumer performed at this time satisfy any outstanding and/or remaining criteria required for receiving any pending discount (Blocks 600 and 610), the pending discount is then applied to the consumer's order (Block 620), payment for the order is processed (Block 630) and the transaction is completed (Block 640).

By correlating the identifying indicia of the product with a discount record maintained within a data file, the details of a coupon can be dynamically revised prior to, and even during the course of, a transaction involving the product and the coupon. This can be accomplished by simply preparing an amended Coupon Data File, and uploading the amended Coupon Data File to the POS system of merchant 100 (in the manner described above). Furthermore, amendment of the Coupon Data File can be employed to promptly and universally correct any errors that may occur in the implementation of the "coupon event." The ability to dynamically and universally revise the Coupon Data File can provide increased flexibility and offer substantial benefits over conventional paper coupons. For example, in some circumstances, printing errors may occur during the creation of conventional paper coupons. In such instances, vast numbers of coupons may be distributed having incorrect information, such as erroneous information which provides an undesired or incorrect level of discount. Such errors may cause dissatisfied consumers and/or undesired costs. However, as described above, the Present Invention can be rapidly and inexpensively amended to correct any errors that may occur.

Periodically, data from the POS systems is compiled into an Transaction Log Data File. Specifically, the Transaction Log Data File is generated, containing all or part of the transaction log data recorded by the POS systems. The Transaction Log Data File records information concerning each transaction, including the date and time of the transaction, the UPC of each product purchased and any other relevant information.

Each merchant 100 will typically create a subset of data from the Transaction Log Data File for Coupon Processing Center 200, containing information required for processing coupons. This data subset preferably contains all transaction data required for Coupon Processing Center 200 to validate that all criteria were met for the POS system of each merchant 100 to apply the coupon discount to the transaction.

The information provided for each transaction includes, for example, the identifying indicia of each coupon-eligible product; the regular price of that product; the amount paid by the consumer; the type of coupon applied (e.g., the PIC code); the tender type; quantities of all products that participated in satisfying the criteria of the coupon; any discount awarded; the date and time of the transaction; the terminal where the transaction occurred, the operator at the terminal where the transaction occurred; any transactional number; and information from any external input provided by the consumer that resulted in a coupon discount being applied (i.e., payment type, response to a prompt, etc.).

When each merchant 100 is ready to submit its coupon redemptions for reimbursement, the Transaction Log Data File is transmitted by each merchant 100 to inbox 220. The Transaction Log Data File is subsequently transferred to database 214 for processing. Coupon Processing Center 200, preferably through a Transaction Log Processor, analyzes the Transaction Log Data File to verify that all criteria was met to apply the coupon to the transaction, and to tabulate the identity and number of coupon redemptions eligible for reimbursement. This analysis can be performed using standard and/or currently-known data transformation software.

Because Coupon Processing Center 200 processes the Transaction Log Data File from the POS system of each merchant 100, additional levels of auditing and fraud prevention can be implemented that are not typically available in connection with conventional paper coupons. For example, if manufacturer 300 offers a promotion in which a consumer buys two of a particular product and receives a third product free, database 214 can analyze the transaction in which the coupon was redeemed to ensure that each merchant 100 in fact sold, and the consumer purchased, at least three of the eligible products. Likewise, if manufacturer 300 sponsors a discount on a product having a particular identifying indicia, database 214 analyzes each Transaction Log Data File to ensure that the discount is only applied when the corresponding identifying indicia has been sold. Thus, unlike paper coupons, each merchant 100 is prevented from seeking reimbursement for coupons that did not accompany the sale of an eligible product.

After Coupon Processing Center 200 tabulates the reimbursable coupon redemptions for each merchant 100, the resulting data is conveyed to Accounting Server 224. Accounting Server 224 generates invoices for each manufacturer 300 sponsoring redeemed coupons, and conveys the invoices to the appropriate manufacturer 300. In addition to the invoice, each manufacturer 300 also receives a Manufacturer Report, which details coupon redemption activity. Unlike conventional paper coupons, in which each manufacturer 300 typically only receives an aggregate number of paper coupons with little other information, the Manufacturer Report provided in connection with the Present Invention may include additional information, such as the source, time and location of coupon redemptions. This additional information may be used by each manufacturer 300 to evaluate the effectiveness of each promotional campaign. Coupon redemption data can also be provided via the manufacturer interface to server 210.

Database 214 may optionally also generate Merchant Reports for each merchant 100. For example, a Merchant Report may be generated detailing coupon redemption activity for each sales location 101. Financial information may be provided, confirming with each merchant 100 the amount of pending coupon reimbursements due. Also, the Merchant Report can be used to audit coupon redemption activity. In particular, each merchant 100 can compare the number of coupons redeemed by each sales location 101 to the number of redemptions authorized for reimbursement by Coupon Processing Center 200. The resulting comparison can be used to detect any invalid coupon redemption activity or cashier/retailer fraud undertaken at particular sales locations 101. Coupon redemption information can also be provided through a merchant web site (not illustrated), hosted on server 210. Server 210 draws information detailing coupon redemption activity from database 214 through firewall 212.

After each manufacturer 300 processes invoices from Accounting Server 224, payment is made to an account in bank 310, which may be maintained by Coupon Processing Center 200 or by each manufacturer 300. Coupon Processing Center 200 then distributes the appropriate amount of coupon redemption funds, aggregated from among each manufacturer 300 for which each merchant 100 has redeemed coupons, to bank 110, again which may be maintained by Coupon Processing Center 200 or by each merchant 100. Each merchant 100 will preferably be able to access bank 110, thus compensating each merchant 100 for the electronic coupons it has redeemed.

The foregoing description and Figures merely explain and illustrate the Present invention and the Present Invention is not limited thereto, inasmuch as those skilled in the art, having this disclosure before them will be able to make modifications and variations therein without departing from the scope of the Present Invention.

What is claimed is:

1. A system for providing reimbursement of incentives provided to purchasers of one or more items, comprising:
   coupon data generated by a coupon processing center server for download to a merchant point of sale system via a computer network, said coupon data comprised of item records uniquely identifying one or more purchasable items, and incentive records indicative of incentives available to a purchaser in connection with the purchase of said one or more purchasable items;
   transaction log data generated by said merchant point of sale system and transmitted to said coupon processing center server via a computer network, said transaction log data describing one or more purchase transactions, comprised of one or more purchase records corresponding to items purchased, and one or more redemption records corresponding to a purchase record, describing incentives provided to purchasers of said one or more items;
   a transaction log processor server within the coupon processing center configured to identify purchase records corresponding to item records in the coupon data, and tabulate the redemption records associated with said purchase records.

2. The system of claim 1, further comprising a transaction audit processor server, configured to compare redemption records from the transaction log data to incentive records in the coupon data, towards ensuring that eligible redemption records are tabulated by the transaction log processor server.

3. The system of claim 1, further comprising an accounting server which receives redemption information from the transaction log processor server and is configured to generate one or more invoices using said redemption information.

4. A method for reimbursing a retailer for redeemed coupons, said method comprising the steps of:
   transmitting coupon data from a coupon database within a coupon processing center to a merchant point of sale computer system;
   utilizing said coupon data by the merchant point of sale computer system to identify transactions to which coupons are applied;
   transmitting transaction log data from a merchant point of sale computer system to a transaction log processor server, the transaction log data comprising information describing one or more purchase transactions, which information comprises a purchase record of one or more items purchased in connection with the purchase transactions, and a redemption record of a coupon redeemed in connection with the one or more items purchased during the purchase transactions;
   comparing the transaction log data to information stored within said coupon database, which coupon database comprises an item record identifying an item available for sale, and a coupon record corresponding to the item record and describing a coupon value available for redemption in association with the purchase of the item corresponding to the item record;
   tabulating instances of coupon redemption reflected in the transaction log data by the transaction log processor server.

5. The method of claim 4, in which:
   the step of comparing the transaction log data to information stored within said coupon database comprises the step of comparing the transaction log data to information stored within a coupon database, which coupon database comprises: (a) an item record identifying an item available for sale, (b) a coupon record corresponding to the item record and describing a coupon value available for redemption in association with the purchase of the item corresponding to the item record, and (c) a redemption criteria record corresponding to the coupon record and describing one or more conditions that must be satisfied to authorize redemption of a corresponding coupon; and
   the step of tabulating coupon redemptions is further comprised of the substeps of:
   matching by the transaction log processor server the coupon record in the coupon database to the redemption record in the transaction log data; and
   confirming by the transaction log processor server that the redemption criteria is satisfied.

6. The method of claim 5, in which said transaction log data comprises information describing one or more purchase transactions, which information comprises a purchase record of an item purchased in connection with the purchase transactions, a redemption record of a coupon redeemed in connection with the one or more items purchased during the purchase transactions, and a payment method record indicative of the form of payment used in connection with a purchase transaction;
   and where the step of confirming that the redemption criteria is satisfied is comprised of the substep of comparing the payment method record to the redemption criteria;
   whereby a coupon redemption is authorized if the payment method record matches the redemption criteria.

* * * * *